(12) United States Patent
McCormack et al.

(10) Patent No.: US 7,932,196 B2
(45) Date of Patent: Apr. 26, 2011

(54) MICROPOROUS STRETCH THINNED FILM/NONWOVEN LAMINATES AND LIMITED USE OR DISPOSABLE PRODUCT APPLICATIONS

(75) Inventors: Ann Louise McCormack, Cumming, GA (US); Randall James Palmer, Acworth, GA (US); Courtney Eileen Shea, Atlanta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 774 days.

(21) Appl. No.: 10/646,979

(22) Filed: Aug. 22, 2003

(65) Prior Publication Data

US 2005/0042962 A1  Feb. 24, 2005

(51) Int. Cl.
*D04H 3/00* (2006.01)
*B32B 27/12* (2006.01)
*B32B 27/32* (2006.01)

(52) U.S. Cl. .......................... 442/398; 442/327; 442/394
(58) Field of Classification Search .................. 442/327, 442/394, 398
See application file for complete search history.

(56) References Cited

U.S. PATENT DOCUMENTS

| | | |
|---|---|---|
| 3,046,172 A | 7/1962 | Reid |
| 3,233,029 A | 2/1966 | Rasmussen |
| 3,276,944 A | 10/1966 | Levy |
| 3,338,992 A | 8/1967 | Kinney |
| 3,341,394 A | 9/1967 | Kinney |
| 3,383,449 A | 5/1968 | Muller |
| 3,502,538 A | 3/1970 | Petersen |
| 3,502,763 A | 3/1970 | Hartmann |
| 3,542,615 A | 11/1970 | Dobo et al. |
| 3,676,242 A | 7/1972 | Prentice |
| 3,692,618 A | 9/1972 | Dorschner et al. |
| 3,802,817 A | 4/1974 | Matsuki et al. |
| 3,844,865 A | 10/1974 | Elton et al. |
| 3,849,241 A | 11/1974 | Butin et al. |
| 3,849,526 A | 11/1974 | Muller et al. |
| 3,855,046 A | 12/1974 | Hansen et al. |
| 3,870,593 A | 3/1975 | Elton et al. |
| 3,880,966 A | 4/1975 | Zimmerman et al. |
| 3,988,883 A | 11/1976 | Sze |

(Continued)

FOREIGN PATENT DOCUMENTS

CA   803714   1/1969

(Continued)

OTHER PUBLICATIONS

"Fibers," Cargill Dow, Internet web page, "http://www.cargilldow.com/fibers.asp", viewed and printed Jul. 23, 2002, pp. 1-4.

(Continued)

*Primary Examiner* — D. Lawrence Tarazano
*Assistant Examiner* — Matthew D Matzek
(74) *Attorney, Agent, or Firm* — Dority & Manning, P.A.

(57) ABSTRACT

Breathable laminates of a film and nonwoven with increased toughness and the ability to undergo strain without splitting for applications as components of personal care products and other uses. The film is formed using a carrier/letdown resin approach where the filled carrier resin is an ethylene polymer or copolymer having a density at least 0.003 g/cc higher than the letdown resin which is also an ethylene copolymer but has a density in the range of less than about 0.915 g/cc and a melt index less than about 6. The resin phases may be dry blended, formed into a film, stretched and bonded to a nonwoven support layer.

27 Claims, 3 Drawing Sheets

U.S. PATENT DOCUMENTS

| | | | |
|---|---|---|---|
| 4,039,364 A | 8/1977 | Rasmussen | |
| 4,041,203 A | 8/1977 | Brock et al. | |
| 4,100,324 A | 7/1978 | Anderson et al. | |
| 4,106,313 A | 8/1978 | Boe | |
| 4,116,892 A | 9/1978 | Schwarz | |
| 4,136,218 A | 1/1979 | Nischwitz et al. | |
| 4,144,008 A | 3/1979 | Schwarz | |
| 4,153,664 A | 5/1979 | Sabee | |
| 4,153,751 A | 5/1979 | Schwarz | |
| 4,223,059 A | 9/1980 | Schwarz | |
| 4,243,802 A | 1/1981 | Landoll | |
| 4,251,585 A | 2/1981 | Schwarz | |
| 4,265,960 A | 5/1981 | Arbit et al. | |
| 4,285,100 A | 8/1981 | Schwarz | |
| 4,289,832 A | 9/1981 | Schwarz | |
| 4,301,102 A | 11/1981 | Fernstrom et al. | |
| 4,336,638 A | 6/1982 | Mercer | |
| 4,340,563 A | 7/1982 | Appel et al. | |
| 4,350,655 A | 9/1982 | Hoge | |
| 4,364,985 A | 12/1982 | Tokuyama et al. | |
| 4,368,565 A | 1/1983 | Schwarz | |
| 4,374,175 A | 2/1983 | Tanaka | |
| 4,374,888 A | 2/1983 | Bornslaeger | |
| 4,405,686 A | 9/1983 | Kuroda et al. | |
| 4,422,892 A | 12/1983 | Plant | |
| 4,424,257 A | 1/1984 | Bach | |
| 4,438,167 A | 3/1984 | Schwarz | |
| 4,443,513 A | 4/1984 | Meitner et al. | |
| 4,464,815 A | 8/1984 | Canterino et al. | |
| 4,472,328 A | 9/1984 | Sugimoto et al. | |
| 4,475,971 A | 10/1984 | Canterino | |
| 4,517,714 A | 5/1985 | Sneed et al. | |
| 4,521,484 A | 6/1985 | Li | |
| 4,522,203 A | 6/1985 | Mays | |
| 4,533,510 A | 8/1985 | Nissel | |
| 4,563,229 A | 1/1986 | Sorez | |
| 4,629,525 A | 12/1986 | Rasmussen | |
| 4,663,220 A | 5/1987 | Wisneski et al. | |
| 4,701,432 A | 10/1987 | Welborn, Jr. | |
| 4,720,415 A | 1/1988 | Vander Wielen et al. | |
| 4,734,324 A | 3/1988 | Hill | |
| 4,758,239 A | 7/1988 | Yeo et al. | |
| 4,789,699 A | 12/1988 | Kieffer et al. | |
| 4,793,885 A | 12/1988 | Rasmussen | |
| 4,795,668 A | 1/1989 | Krueger et al. | |
| 4,806,300 A | 2/1989 | Walton et al. | |
| 4,818,464 A | 4/1989 | Lau | |
| 4,854,995 A | 8/1989 | Kasper et al. | |
| 4,861,660 A | 8/1989 | Ishii | |
| 4,863,785 A | 9/1989 | Berman et al. | |
| 4,867,881 A | 9/1989 | Kinzer | |
| 4,877,679 A | 10/1989 | Leatherman et al. | |
| 4,923,650 A | 5/1990 | Antoon, Jr. et al. | |
| 4,965,122 A | 10/1990 | Morman | |
| 4,972,522 A | 11/1990 | Rautenberg | |
| 4,981,747 A | 1/1991 | Morman | |
| 4,992,124 A | 2/1991 | Kurihara et al. | |
| 5,011,698 A | 4/1991 | Antoon, Jr. et al. | |
| 5,028,289 A | 7/1991 | Rasmussen | |
| 5,057,368 A | 10/1991 | Largman et al. | |
| 5,064,802 A | 11/1991 | Stevens et al. | |
| 5,069,970 A | 12/1991 | Largman et al. | |
| 5,108,820 A | 4/1992 | Kaneko et al. | |
| 5,108,827 A | 4/1992 | Gessner | |
| 5,116,662 A | 5/1992 | Morman | |
| 5,117,540 A | 6/1992 | Walton et al. | |
| 5,120,594 A | 6/1992 | Mrozinski | |
| 5,143,679 A | 9/1992 | Weber et al. | |
| 5,145,727 A | 9/1992 | Potts et al. | |
| 5,156,793 A | 10/1992 | Buell et al. | |
| 5,164,258 A | 11/1992 | Shida et al. | |
| 5,167,897 A | 12/1992 | Weber et al. | |
| 5,169,706 A | 12/1992 | Collier, IV et al. | |
| 5,176,953 A | 1/1993 | Jacoby et al. | |
| 5,178,931 A | 1/1993 | Perkins et al. | |
| 5,188,885 A | 2/1993 | Timmons et al. | |
| 5,204,429 A | 4/1993 | Kaminsky et al. | |
| 5,226,992 A | 7/1993 | Morman | |
| 5,238,623 A | 8/1993 | Mrozinski | |
| 5,256,231 A | 10/1993 | Gorman et al. | |
| 5,256,417 A | 10/1993 | Koltisko | |
| 5,271,883 A | 12/1993 | Timmons et al. | |
| 5,277,976 A | 1/1994 | Hogle et al. | |
| 5,288,791 A | 2/1994 | Collier, IV et al. | |
| 5,294,482 A | 3/1994 | Gessner | |
| 5,296,184 A | 3/1994 | Wu et al. | |
| 5,332,613 A | 7/1994 | Taylor et al. | |
| 5,336,545 A | 8/1994 | Morman | |
| 5,336,552 A | 8/1994 | Strack et al. | |
| 5,352,518 A | 10/1994 | Muramoto et al. | |
| 5,370,940 A | 12/1994 | Hazlitt et al. | |
| 5,374,696 A | 12/1994 | Rosen et al. | |
| 5,376,430 A | 12/1994 | Swenson et al. | |
| 5,380,313 A | 1/1995 | Goulait et al. | |
| 5,380,578 A | 1/1995 | Rautenberg | |
| 5,382,400 A | 1/1995 | Pike et al. | |
| 5,393,599 A | 2/1995 | Quantrille et al. | |
| 5,395,810 A | 3/1995 | Shamshoum et al. | |
| 5,411,636 A | 5/1995 | Hermans et al. | |
| 5,418,045 A | 5/1995 | Pike et al. | |
| 5,424,025 A | 6/1995 | Hanschen et al. | |
| 5,425,987 A | 6/1995 | Shawver et al. | |
| 5,429,856 A | 7/1995 | Krueger et al. | |
| 5,451,450 A | 9/1995 | Erderly et al. | |
| 5,455,992 A | 10/1995 | Kurschatke et al. | |
| 5,456,982 A | 10/1995 | Hansen et al. | |
| 5,466,410 A | 11/1995 | Hills | |
| 5,468,702 A | 11/1995 | Jejelowo | |
| 5,472,775 A | 12/1995 | Obijeski et al. | |
| 5,489,469 A | 2/1996 | Kobayashi et al. | |
| 5,492,598 A | 2/1996 | Hermans et al. | |
| 5,498,468 A | 3/1996 | Blaney | |
| 5,501,679 A | 3/1996 | Krueger et al. | |
| RE35,206 E | 4/1996 | Hassenboehler, Jr. et al. | |
| 5,514,470 A | 5/1996 | Haffner et al. | |
| 5,514,634 A | 5/1996 | Hagerty et al. | |
| 5,518,801 A | 5/1996 | Chappell et al. | |
| 5,527,752 A | 6/1996 | Reichle et al. | |
| H1558 H | 7/1996 | Goulait et al. | |
| 5,539,124 A | 7/1996 | Etherton et al. | |
| 5,540,976 A | 7/1996 | Shawver et al. | |
| 5,540,992 A | 7/1996 | Marcher et al. | |
| 5,554,775 A | 9/1996 | Krishnamurti et al. | |
| 5,576,374 A | 11/1996 | Betso et al. | |
| 5,599,420 A | 2/1997 | Yeo et al. | |
| 5,604,036 A | 2/1997 | Price et al. | |
| 5,614,281 A | 3/1997 | Jackson et al. | |
| 5,624,427 A | 4/1997 | Bergman et al. | |
| 5,628,097 A | 5/1997 | Benson et al. | |
| 5,643,846 A | 7/1997 | Reddy et al. | |
| 5,648,428 A | 7/1997 | Reddy et al. | |
| 5,650,225 A | 7/1997 | Dutta et al. | |
| 5,651,853 A | 7/1997 | Wrigley et al. | |
| 5,661,096 A | 8/1997 | Winter et al. | |
| 5,665,083 A | 9/1997 | Igaue et al. | |
| 5,690,627 A | 11/1997 | Clear et al. | |
| 5,691,034 A | 11/1997 | Krueger et al. | |
| 5,695,868 A | 12/1997 | McCormack | |
| 5,707,468 A | 1/1998 | Arnold et al. | |
| 5,723,087 A | 3/1998 | Chappell et al. | |
| 5,723,546 A | 3/1998 | Sustic | |
| 5,733,628 A | 3/1998 | Pelkie | |
| 5,735,840 A | 4/1998 | Kline et al. | |
| 5,743,999 A | 4/1998 | Kamps et al. | |
| 5,747,405 A | 5/1998 | Little et al. | |
| 5,756,580 A | 5/1998 | Natori et al. | |
| 5,758,842 A | 6/1998 | Dorfel et al. | |
| 5,759,926 A | 6/1998 | Pike et al. | |
| 5,763,334 A | 6/1998 | Gupta et al. | |
| 5,770,531 A | 6/1998 | Sudduth et al. | |
| 5,804,524 A | 9/1998 | Reddy et al. | |
| 5,814,567 A | 9/1998 | Yahiaoui et al. | |
| 5,846,365 A | 12/1998 | Kline et al. | |
| 5,853,635 A | 12/1998 | Morell et al. | |
| 5,883,028 A | 3/1999 | Morman et al. | |
| 5,888,607 A | 3/1999 | Seth et al. | |
| 5,900,306 A | 5/1999 | Stopper | |

| US Patent | Date | Inventor |
|---|---|---|
| 5,910,136 A | 6/1999 | Hetzler et al. |
| 5,914,084 A | 6/1999 | Benson et al. |
| 5,928,211 A | 7/1999 | Gustafsson et al. |
| 5,928,212 A | 7/1999 | Kline et al. |
| 5,945,175 A | 8/1999 | Yahiaoui et al. |
| 5,957,907 A | 9/1999 | Sauer |
| 5,972,502 A | 10/1999 | Jessee et al. |
| 5,984,911 A | 11/1999 | Siebers et al. |
| 5,993,589 A | 11/1999 | Morman |
| 6,015,764 A | 1/2000 | McCormack et al. |
| 6,017,832 A | 1/2000 | Yahiaoui et al. |
| 6,028,016 A | 2/2000 | Yahiaoui et al. |
| 6,037,417 A | 3/2000 | Nguyen et al. |
| 6,045,900 A * | 4/2000 | Haffner et al. .............. 428/315.9 |
| 6,054,002 A | 4/2000 | Griesbach et al. |
| 6,072,005 A | 6/2000 | Kobylivker et al. |
| 6,075,179 A | 6/2000 | McCormack et al. |
| 6,096,014 A | 8/2000 | Haffner et al. |
| 6,106,956 A * | 8/2000 | Heyn et al. .................... 428/516 |
| 6,111,163 A | 8/2000 | McCormack et al. |
| 6,114,024 A | 9/2000 | Forte |
| 6,135,987 A | 10/2000 | Tsai et al. |
| 6,156,421 A | 12/2000 | Stopper et al. |
| 6,169,045 B1 | 1/2001 | Pike et al. |
| 6,172,177 B1 | 1/2001 | Wang et al. |
| 6,174,602 B1 | 1/2001 | Matsui et al. |
| 6,179,939 B1 | 1/2001 | Jones, Jr. et al. |
| 6,190,758 B1 | 2/2001 | Stopper |
| 6,203,654 B1 | 3/2001 | McFall et al. |
| 6,204,208 B1 | 3/2001 | Krzysik et al. |
| 6,214,274 B1 | 4/2001 | Melius et al. |
| 6,225,243 B1 | 5/2001 | Austin |
| 6,242,041 B1 | 6/2001 | Katoot et al. |
| 6,242,084 B1 | 6/2001 | Peet |
| 6,258,308 B1 * | 7/2001 | Brady et al. ................ 264/210.2 |
| 6,264,864 B1 | 7/2001 | Mackay |
| 6,265,045 B1 | 7/2001 | Mushaben |
| 6,268,062 B1 | 7/2001 | DeMeuse |
| 6,270,912 B1 | 8/2001 | Peet |
| 6,309,736 B1 | 10/2001 | McCormack et al. |
| 6,329,454 B1 | 12/2001 | Krabbenborg |
| 6,355,200 B1 | 3/2002 | Schmidt et al. |
| 6,383,431 B1 | 5/2002 | Dobrin et al. |
| 6,399,531 B1 | 6/2002 | Job et al. |
| 6,403,717 B1 | 6/2002 | Adams et al. |
| 6,409,711 B1 | 6/2002 | Jönbrink |
| 6,444,302 B1 | 9/2002 | Srinivas et al. |
| 6,447,875 B1 * | 9/2002 | Norquist et al. .............. 428/107 |
| 6,461,457 B1 | 10/2002 | Taylor et al. |
| 6,475,591 B2 | 11/2002 | Mushaben |
| 6,479,154 B1 | 11/2002 | Walton et al. |
| 6,481,483 B1 | 11/2002 | Kobayashi et al. |
| 6,680,265 B1 | 1/2004 | Smith et al. |
| 6,706,228 B2 | 3/2004 | Mackay |
| 2001/0041487 A1 | 11/2001 | Brady et al. |
| 2001/0042938 A1 | 11/2001 | Mackay |
| 2002/0004350 A1 | 1/2002 | Morman et al. |
| 2002/0006482 A1 | 1/2002 | Falla et al. |
| 2002/0088534 A1 | 7/2002 | Kobayashi et al. |
| 2002/0105110 A1 | 8/2002 | Dobrin et al. |
| 2002/0111598 A1 | 8/2002 | Vogt et al. |
| 2002/0117770 A1 | 8/2002 | Haynes et al. |
| 2003/0045844 A1 | 3/2003 | Taylor et al. |
| 2003/0050618 A1 | 3/2003 | Kondo et al. |
| 2003/0065297 A1 | 4/2003 | Davis et al. |
| 2003/0071391 A1 | 4/2003 | Brady et al. |
| 2003/0171054 A1* | 9/2003 | Bansal .......................... 442/361 |
| 2004/0021251 A1 | 2/2004 | Wheat et al. |
| 2004/0087235 A1 | 5/2004 | Morman et al. |
| 2004/0091752 A1 | 5/2004 | Morman et al. |
| 2004/0110442 A1 | 6/2004 | Rhim et al. |
| 2004/0122408 A1 | 6/2004 | Potnis et al. |
| 2004/0127131 A1 | 7/2004 | Potnis |
| 2005/0043460 A1 | 2/2005 | McCormack et al. |
| 2005/0101206 A1 | 5/2005 | McCormack et al. |

FOREIGN PATENT DOCUMENTS

| | | |
|---|---|---|
| DE | 2503775 | 8/1976 |
| DE | 25 13 251 | 9/1976 |
| DE | 198 33 661 | 8/1999 |
| EP | 0 068 659 | 1/1983 |
| EP | 0 064 853 | 7/1986 |
| EP | 0 090 380 | 12/1990 |
| EP | 0 341 993 | 8/1993 |
| EP | 0556749 | 8/1993 |
| EP | 0 276 100 | 8/1994 |
| EP | 0 575 509 | 10/1994 |
| EP | 0 379 763 | 12/1994 |
| EP | 0 370 835 | 12/1995 |
| EP | 0754544 | 1/1997 |
| EP | 0 409 315 | 5/1997 |
| EP | 0 573 586 | 5/1997 |
| EP | 0 829 566 | 3/1998 |
| EP | 0 551 327 | 6/1998 |
| EP | 0 714 351 | 12/1998 |
| EP | 0 712 304 | 4/1999 |
| EP | 0 782 639 | 10/1999 |
| EP | 0 676 418 | 7/2000 |
| EP | 1 066 962 | 1/2001 |
| EP | 1 068 853 | 1/2001 |
| EP | 1 151 846 | 11/2001 |
| EP | 0 747 402 | 12/2001 |
| EP | 1 091 968 | 1/2002 |
| EP | 0 852 483 | 4/2002 |
| EP | 0 927 096 | 5/2002 |
| EP | 1 216 135 | 5/2003 |
| EP | 1 335 057 | 8/2003 |
| EP | 1068259 | 10/2004 |
| GB | 1521579 | 8/1978 |
| GB | 1526722 | 9/1978 |
| GB | 1526723 | 9/1978 |
| GB | 1526724 | 9/1978 |
| GB | 1553102 | 9/1979 |
| GB | 1579718 | 11/1980 |
| GB | 1598737 | 9/1981 |
| GB | 2284538 | 6/1995 |
| GB | 2310606 | 9/1997 |
| GB | 2325146 | 11/1998 |
| JP | 60-194947 | 10/1985 |
| JP | 03-192132 | 8/1991 |
| JP | 07-002922 | 1/1995 |
| JP | 08-003203 | 1/1996 |
| JP | 08-041118 | 2/1996 |
| JP | 08-231625 | 9/1996 |
| JP | 2001261868 | 9/2001 |
| JP | 2002069812 | 3/2002 |
| WO | WO 92/01401 | 2/1992 |
| WO | WO 93/15251 | 8/1993 |
| WO | WO 96/19346 | 6/1996 |
| WO | WO 97/02133 | 1/1997 |
| WO | WO 97/04955 | 2/1997 |
| WO | WO 97/29909 | 8/1997 |
| WO | WO 97/45259 | 12/1997 |
| WO | WO 97/49848 | 12/1997 |
| WO | WO 98/04397 | 2/1998 |
| WO | WO 98/05501 | 2/1998 |
| WO | WO 98/05502 | 2/1998 |
| WO | WO 98/23804 | 6/1998 |
| WO | WO 98/29239 | 7/1998 |
| WO | WO 98/29480 | 7/1998 |
| WO | WO 98/31318 | 7/1998 |
| WO | WO 98/48091 | 10/1998 |
| WO | WO 98/51475 | 11/1998 |
| WO | WO 98/58799 | 12/1998 |
| WO | WO 99/14039 | 3/1999 |
| WO | WO 99/14044 | 3/1999 |
| WO | WO 99/14046 | 3/1999 |
| WO | WO 99/14262 | 3/1999 |
| WO | WO 99/37840 | 7/1999 |
| WO | WO 99/49833 | 7/1999 |
| WO | WO 99/42068 | 8/1999 |
| WO | WO 99/47590 | 9/1999 |
| WO | WO 00/08243 | 2/2000 |
| WO | WO 00/23255 | 4/2000 |
| WO | WO 00/23509 | 4/2000 |
| WO | WO 00/28123 | 5/2000 |
| WO | WO 00/29199 | 5/2000 |
| WO | WO 00/48834 | 8/2000 |

| | | |
|---|---|---|
| WO | WO 00/56522 | 9/2000 |
| WO | WO 00/69383 | 11/2000 |
| WO | WO 00/69615 | 11/2000 |
| WO | WO 00/76445 | 12/2000 |
| WO | WO 00/76446 | 12/2000 |
| WO | WO 01/00398 | 1/2001 |
| WO | WO 01/12306 | 2/2001 |
| WO | WO 01/14627 | 3/2001 |
| WO | WO 01/16219 | 3/2001 |
| WO | WO 01/19592 | 3/2001 |
| WO | WO 01/23180 | 4/2001 |
| WO | WO 01/83599 A1 * | 4/2001 |
| WO | WO 01/32116 | 5/2001 |
| WO | WO 01/40358 | 6/2001 |
| WO | WO 01/47710 | 7/2001 |
| WO | WO 01/83210 | 11/2001 |
| WO | WO 01/83599 | 11/2001 |
| WO | WO 02/100207 | 12/2002 |
| WO | WO 02/102592 | 12/2002 |
| WO | WO 03/028606 | 4/2003 |
| WO | WO 03/057106 | 7/2003 |
| WO | WO 03/072338 | 9/2003 |
| WO | WO 2004/020174 | 3/2004 |

OTHER PUBLICATIONS

"PLA Processing Guide for Bulked Continuous Filament (BCF)," Cargill Dow, Internet web page, "http://www.cargilldow.com/pdf/fiberguide.html", viewed and printed Jul. 23, 2002, pp. 1-3.

Lunt, James and Andrew L. Shafer, "Polylactic Acid Polymers from Corn Potential Applications in the Textiles Industry," *Journal of Industrial Textiles*, vol. 29, No. 3, Jan. 2000, pp. 191-205 (reprint pp. 1-8).

Encyclopedia of Polymer Science and Engineering, Wiley & Sons, vol. 10, 211-212, 1987.

*Polymer Blends and Composites*, John A. Manson and Leslie H. Sperling, copyright 1976, Plenum Press, ISBN-0-306-30831-2, pp. 273-277.

INDA (Association of the Nonwoven Fabrics Industry) No. IST-70.4-99, entitled "Standard Test Method for Water Vapor Transmission Rate Through Nonwoven and Plastic Film Using a Guard Film and Vapor Pressure Sensor".

NRL Report 4364, "Manufacture of Super-Fine Organic Fibers" by V. A. Wente, E. L. Boone and C. D. Fluharty, May 25, 1954.

NRL Report 5265, "An Improved Device for the Formation of Super-Fine Thermoplastic Fibers" by K.D. Lawrence, R. T. Lukas, J. A. Young.

ASTM D882-97, "Standard Test Method for Tensile Properties of Thin Plastic Sheeting", pp. 159-167, Apr. 1998.

Kirk-Othmer, Encyclopedia of Chemical Technology, Fourth Edition, John Wiley & Sons, Inc., New York, vol. 17, 765-767, 1996.

US 5,242,876, 09/1993, Shamshoum et al. (withdrawn)

* cited by examiner

MICROPOROUS STRETCH THINNED FILM/NONWOVEN LAMINATES AND LIMITED USE OR DISPOSABLE PRODUCT APPLICATIONS

RELATED APPLICATION

This application is one of two applications directed to related subject matter filed on the same day. The other application Ser. No. 10/646,978 is entitled "MICROPOROUS BREATHABLE ELASTIC FILMS, METHODS OF MAKING SAME, AND LIMITED USE OR DISPOSABLE PRODUCT APPLICATIONS" with inventors Ann Louise McCormack and Susan Elaine Shawver incorporated herein by reference.

FIELD OF THE INVENTION

The present invention is directed to stretch thinned films and their use in film/nonwoven laminates for applications such as disposable diaper components.

Film/nonwoven laminates are used in a wide variety of applications not the least of which is as outercovers for personal care products like swimwear and absorbent articles such as diapers, training pants, incontinence garments, feminine hygiene products, wound dressings, bandages and the like. Film/nonwoven laminates also have applications in the health care area in conjunction with such products as surgical drapes and gowns and other apparel for clean room, health care and other related uses. In the personal care area in particular, there has been an emphasis on the development of low cost laminates which have good barrier properties, especially with respect to liquids, as well as good aesthetic and tactile properties such as cloth-like hand and feel. To this end, it has become increasingly more advantageous to use films which are thinner. Thinner films are lower in cost and, because of their reduced gauge, oftentimes softer and more quiet. Thinner films also can be made more breathable for added comfort.

Thinner films, which sometimes have basis weight less than 30 grams per square meter (gsm), also tend to be fairly weak. This is especially true in the cross machine direction ("CD" or orthogonal to direction of film movement in manufacture or processing) since to obtain such low thicknesses the films are often highly stretched in the machine direction ("MD" or direction of film movement in manufacture or processing). Severe orientation in the machine direction tends to orient the polymer molecules making up the film. Such orientation can greatly increase the strength of the film in the machine direction but it also tends to reduce the extensibility of the same film in the cross machine direction which is important for garment donning and in-use conditions, for example. By laminating a support layer such as a fibrous nonwoven web to the film layer, a laminate can be created with additional properties. The nonwoven layer can add increased strength to the overall composite. In addition, it can impart such properties as a cloth-like feel which is important in many applications, including personal care absorbent articles. Unfortunately, heretofore film/nonwoven laminates have not always provided optimum benefits especially in the area of extensibility. As a result, the film portions of such laminates have tended to split thereby providing less than optimum performance in the overall product. This has been especially true when the film of the film/nonwoven laminate has been utilized as a barrier material as, for example, an outercover for a personal care absorbent article. Consequently, there is a need for improved film/nonwoven laminates, especially in cases where the film layer has been highly oriented in a single direction and the overall thickness or basis weight of the film has been greatly reduced.

SUMMARY OF THE INVENTION

The invention provides a method and breathable film/nonwoven laminate and applications in personal care products such as disposable diapers. The film component of the laminate uses a letdown/carrier concentrate forming approach using ethylene copolymer resins in the letdown phase and ethylene polymer or copolymer in the carrier resin phase. In particular, the letdown ethylene copolymer has a density less than about 0.915 and a melt index less than about 6. The carrier resin includes a filler and also uses an ethylene polymer or copolymer resin but one with a density at least about 0.003 g/cc greater than the letdown resin. The letdown and carrier phases are used in amounts resulting in a final filler concentration in the range of from about 30% to about 70% in the film. The film is stretched for breathability and laminated to a nonwoven such as a spunbond, a spunbond laminate or a carded web. Specific embodiments include the use of calcium carbonate as the filler and the use of an adhesive laminating step. Others include specific letdown resin density ranges of less than about 0.913 g/cc or within the range of about 0.900 to about 0.912 g/cc. Nonwovens may be, for example, spunbond or bonded carded webs. The invention also is directed to embodiments where the film basis weight is in the range of from about 13 gsm to about 25 gsm and embodiments where one or both of the ethylene copolymer resins is linear low density polyethylene (LLDPE). The invention also is directed to high breathability embodiments having breathability of 5000 to 10,000 g/m/24 hours or higher. In addition, the invention includes a process for making a breathable film/nonwoven laminate including the steps of:

a. selecting a letdown ethylene copolymer resin having a density less than 0.915 g/cc and a melt index less than about 6;
b. dispersing a filler in a carrier ethylene polymer or copolymer resin having a density at least about 0.003 g/cc higher than the letdown resin;
c. dry blending the letdown resin and filled carrier resin in amounts to provide a filler concentration in the blend of about 30% to 70% by weight;
d. extruding the blend to form a film;
e. stretching the film; and
f. bonding the film to a nonwoven layer.

The invention is also directed to applications for the breathable film/nonwoven laminate including as components of personal care products such as diaper backings.

BRIEF DESCRIPTION OF THE DRAWINGS

The invention will be better understood by reference to the following description of embodiments of the invention taken in conjunction with the accompanying drawings, wherein.

DETAILED DESCRIPTION

The present invention intends to overcome the above problems of prior art film/non-woven laminates. The object is solved by a film/non-woven laminate wherein the film composition provides increased ability to endure cross direction strain or extensibility without failure.

Further advantages, features, aspects and details of the invention are evident from the claims, the description and the accompanying drawings.

The present invention is directed to microporous film compositions and nonwoven laminates wherein the film layer has been oriented in at least the machine direction before or after it has been attached to a support layer such as a fibrous nonwoven web.

More particularly the present invention is directed to film/non-woven laminates having very low gauge or basis weight films and improved film integrity in the laminate under strain conditions.

Many products today especially in the area of disposable products such as personal care absorbent products, utilize films and fibrous nonwoven webs as components. From a cost standpoint, it is often desirable to make the materials as low gauge as possible. One way to do this with films is to stretch or orient the film, for example, in the machine direction to lower the basis weight or thickness of the film. In orienting the film, the film will generally pick up strength in the machine direction (the direction of stretching) but at the same time will lose strength in the cross machine direction (the direction perpendicular to the direction of stretching). As a result, a support layer such as a fibrous nonwoven web is commonly laminated to the film layer to add strength as well as to provide clothlike attributes.

The film layer, support layer and laminate all have a machine direction and a cross machine direction. Prior to lamination, the film layer is oriented in at least the machine direction so that it has basis weight of about 30 gsm or less. The fact that the film layer has been oriented in the machine direction can be determined by comparing the machine and cross machine direction strengths of the oriented film. An oriented film will have a strength in one direction as measured by the strip tensile test described below which is usually at least about twice the strength in the direction generally perpendicular to the first direction. The direction with the stronger strength will be the direction of stretching, in the current case, the machine direction and the direction with the weaker strength will be the cross machine direction. The film layer, the fibrous nonwoven support layer and the laminate all have or define a machine direction and a cross machine direction with the machine directions of the film and nonwoven layers in many cases having been aligned with one another in the machine direction prior to lamination.

Unless otherwise indicated, values were measured in the cross machine direction for the film layer after machine direction orientation, before or after lamination film break strain as measured by 1 inch (2.54 cm) strip tensile and extensibility as measured by elongation at break value.

Two methods of formulating films for making breathable filled films are a concentrate letdown approach and a fully compounded approach. In a concentrate letdown process, one resin is used as a carrier resin to make a concentrate with calcium carbonate or other fillers. The carrier resin, typically a high melt index/low viscosity resin, is used to disperse high loadings of filler. The letdown resin dominates the tensile properties of the film, believed to be because of its higher molecular weight as compared to the molecular weight of the carrier resin. The concentrate is let down (combined) with another resin, typically a low melt index/high viscosity resin, to dilute the calcium carbonate to a desired percentage. Using two different resins in this manner offers processing and efficiency advantages but can present difficulty in maintaining a desired component ratio in the film formulation intended to provide extensibility attributes.

The present invention is directed to improved film formulations for the letdown approach that result in better film properties including film break strain (reduced tendency to split) and to applications for such films, particularly as a thin component of a breathable laminate.

Some conventional films for the described and other applications typically require between about 550 and about 800 grams of force, or higher, per 3 inches to extend the film in a cross-direction by about 25% to about 50%. Other conventional films have lower extensibility requirements, but in virtually all cases, it is desirable that films reliably endure forces encountered under conditions of use without rupture, especially at thinner thicknesses as utilized in such applications as diaper backsheets, training pant outer covers, and other absorbent garments that are designed to conform to a wearer's body. Better performance and efficiency can be achieved through improved film integrity under extension.

The support layer can be made from a wide variety of materials including various fibrous nonwoven webs. Examples of such webs include, but are not limited to, spunbond nonwoven webs, bonded carded webs, and laminates such as spunbond/meltblown and spunbond/meltblown/spunbond webs. With spunbond/meltblown webs it is generally more desirable to attach the meltblown portion of the laminate to the film layer. In addition, in certain applications it may be desirable to add other layers to the film/nonwoven laminate such as, for example, a second nonwoven or other support layer to the surface of the film layer which is opposite that of the other nonwoven layer. Here again, the second support layer may be, for example, as single layer of nonwoven material or a laminate such as a spunbond/meltblown/spunbond laminate.

The film/nonwoven laminate of the present invention has a wide variety of applications including uses in personal care absorbent articles such as diapers, training pants, incontinence garments, sanitary napkins, wound dressings, bandages and the like. Typically such articles will have a liquid pervious top sheet and a back sheet with an absorbent core disposed between the top sheet and the back sheet. If the film layer of the film/nonwoven laminate is made to be liquid pervious, it can be used as the top sheet. If it is substantially liquid impervious, it can be used as the back sheet. Other applications would include, but not be limited to, using the film/nonwoven laminate according to the present invention as all or a portion of such products as surgical drapes and gowns as well as articles of clothing in general. In many of these applications it may be desirable for the laminate to be breathable in which case the laminate should have a water vapor transmission rate of at least 300 grams per square meter per 24 hours as determined by Mocon test procedure. Desirably the water vapor transmission rate is much higher, for example, in the range of 1000 to 5000 grams per square meter per 24 hours or in the range of 5000 to 10,000 grams per square meter per 24 hours or even higher.

The present invention is directed to a film/nonwoven laminate with increased cross machine direction (CD) extensibility and integrity as a result of its improved film formulation. The film employed in the present invention has been oriented in at least the machine direction (MD) generally a sufficient amount to yield a film with a basis weight of about 30 grams per square meter (gsm) or less, suitably about 25 gsm or less, and desirably in the range of from about 13 gsm to about 25 gsm. Such orientation will often require that the film be stretched at least two times its original or unstretched length. Once the film has been oriented, it is then laminated to a fibrous nonwoven web using heat and pressure such as with heated calender rolls or by ultrasonic bonding techniques. Alternatively, the two layers can be laminated together using adhesives. As a further alternative, for some specific applications, the film may be stretched by stretching the laminate instead of or in addition to stretching prior to lamination.

Important to the design of a film/nonwoven laminate according to the present invention is the selection of a very low density, low modulus resin as the letdown resin in the film formulation. More particularly the letdown resin is LLDPE having a density less than 0.915 g/cc, preferably less than 0.913 g/cc and more desirably between 0.900 and 0.912 g/cc. The resin also has a melt index of less than 6 g/10 min, desirably less than 4 g/10 min, and more desirably less than 2.5 g/10 min. While the lower limit is not critical, as a practical matter, the letdown resin melt index will normally be above about 1.5g/10 min. The film formulation also includes a carrier resin containing well dispersed filler such as $CaCO_3$ and which may be selected from ethylene polymers and copolymers having a density at least 0.003 g/cc, desirably at least 0.007 g/cc higher than that of the letdown resin, for example. Examples include polyethylene and ethylene copolymers available from Dow Chemical Company, such as Dowlex 2517 (25 Ml, 0.917 g/cc.); Dow LLDPE DNDA-1082 (155 Ml, 0.933 g/cc); Dow LLDPE DNDB-1077 (100 Ml, 0.929 g/cc), Dow LLDPE 1081 (125 Ml, 0.931 g/cc), and Dow LLDPE DNDA 7147 (50 Ml, 0.926 g/cc). In some instances, higher density polymers may be useful, such as Dow HDPE DMDA-8980 (80 Ml, 0.952 g/cc). The upper limit of the density difference is not believed to be critical, but selection of resins will not normally result in a difference of more than about 0.060 g/cc. For some applications, it is desired that the melt index of the carrier resin be greater than about 10 g/10 min, and in others more than about 20 g/10 min. The formulation is obtained by mixing the filler with the carrier resin forming concentrate pellets, for example, and then combining the carrier resin pellets by, for example, dry blending with pellets of the letdown resin in an amount selected to produce the desired final filler concentration and resulting film breathability. Desirably the concentrate filler resin will have the filler in the range of from about 65% by weight to about 85% by weight, more desirably from about 70% by weight to about 80% by weight for breathability in the ranges above described. In accordance with the invention, the carrier resin and the letdown LLDPE are processed with limited mixing such as provided by a conventional linear polyethylene barrier single screw mixer available from multiple vendors such as Davis Standard, for example, with the result that the film produced includes at least two phases, a carrier resin phase that is rich in filler and a letdown resin phase that contains little or no filler. The filler concentration of the carrier resin is selected generally to result in a final film resin concentration in the range of from about 30% to about 70%, frequently in the range of from about 40% to about 65% by weight based on the total film weight. Additives in conventional amounts may be included in either or both of the carrier and letdown compositions for stabilization and or processing purposes as known to those skilled in the art.

Heretofore, film/nonwoven laminates using MD oriented films have sometimes failed because the film portions of the laminates have torn or ruptured prematurely. The present invention takes into account the properties of each of the components and other necessary design parameters including film basis weight, MD orientation of the film and certain minimum strain requirements for the film to yield an improved film/nonwoven laminate.

Figure 1:
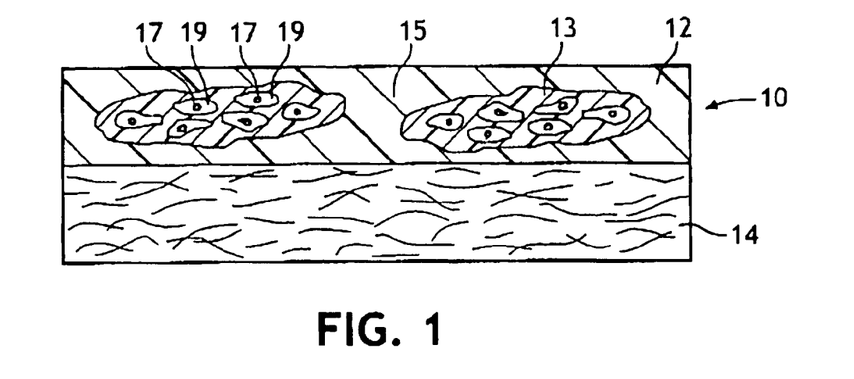
FIG. 1 is a cross-sectional side view of a film/nonwoven laminate according to the present invention.

Referring to FIG. 1, the film/nonwoven laminate 10 according to the present invention includes a film layer 12 and a support layer 14 which can be made from a number of materials besides the illustrated nonwoven, including, for example, films, scrims, wovens and combinations of the foregoing. As shown, for purposes of illustration, the layers are exaggerated and not to scale. Within film layer 12 are letdown resin phase 15 and carrier resin phase 13 which, itself, contains filler particles 17 surrounded by pores 19 as a result of the film 12 being stretched or oriented. Fibrous nonwoven webs have been found to work particularly well from the standpoint of economics, aesthetic properties and strength. Polymer selection for the support layer 14 is not critical provided proper adhesion and strength properties can be achieved. Suitable polymers would include but would not be limited to polyolefins and other thermoplastic polymers. Suitable fibrous nonwoven web forming processes would include, for example, spunbonding, meltblowing, entanglement and carding processes.

Figure 2:
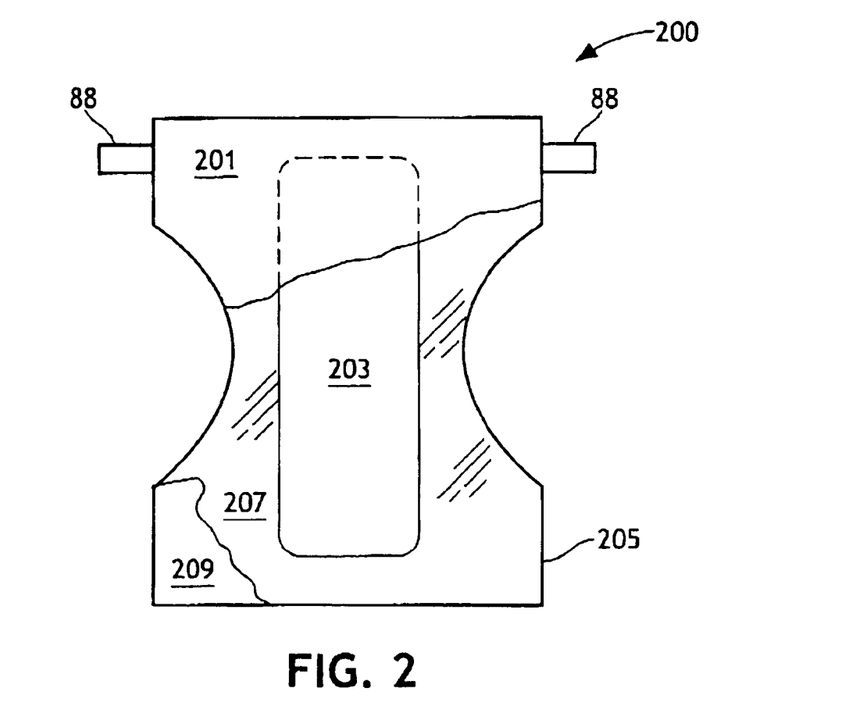
FIG. 2 is a top plan view of a representative personal care article shown as a disposable diaper incorporating a laminate in accordance with the invention as a backsheet.

Referring to FIG. 2, there is shown a personal care article 200 in the form of a disposable diaper shown partially broken away to reveal liner 201, absorbent layer 203 and backing 205 that is a film/non-woven laminate of the invention including film component 207 and nonwoven layer 209. Conventional such articles include closure means shown as 88 such as adhesive tape or mechanical fasteners, for example. As will be apparent to those skilled in the art, the possible variations to this basic personal care article are numerous depending on the particular use and desired functional attributes. The film/nonwoven laminate of the invention is broadly useful in these variations as well.

While, as mentioned, the production of nonwovens useful in accordance with the invention is well established and need not be described in detail to those skilled in the art, several general processes will be summarized. Meltblown fibers are formed by extruding molten thermoplastic material through a plurality of fine, usually circular, die capillaries as molten threads or filaments into a high velocity usually heated gas stream such as air which attenuates the filaments of molten thermoplastic material to reduce their diameters. Thereafter, the meltblown fibers are carried by the high velocity usually heated gas stream and are deposited on a collecting surface to form a web of randomly dispersed meltblown fibers. The meltblown process is well-known and is described in various patents and publications including NRL Report 4364, "Manufacture of Super-Fine Organic Fibers" by B. A. Wendt, E. L. Boone and C. D. Fluharty; NRL Report 5265, "An Improved Device For The Formation of Super-Fine Thermoplastic Fibers" by K. D. Lawrence, R. T. Lukas, J. A. Young; U.S. Pat. No. 3,676,242, issued Jul. 11, 1972, to Prentice; and U.S. Pat. No. 3,849,241, issued Nov. 19, 1974, to Butin, et al. The foregoing references are incorporated herein by reference in their entirety.

Spunbond fibers are formed by extruding a molten thermoplastic material as filaments from a plurality of fine, usually circular, capillaries in a spinneret with the diameter of the extruded filaments then being rapidly reduced, for example, by non-eductive or eductive fluid-drawing or other well-known spunbonding mechanisms. These filaments are generally continuous and collected on a forming surface such as a moving wire or belt as a web. The web is usually bonded by conventional means such as passing through a nip formed by a patterned roll and an anvil roll under heated conditions. The production of spunbond nonwoven webs is illustrated in patents such as Appel et al., U.S. Pat. No. 4,340,563; Matsuki, et al, U.S. Pat. No. 3,802,817; Dorschner et al., U.S. Pat. No. 3,692,618; Kinney, U.S. Pat. Nos. 3,338,992 and 3,341,394; Levy, U.S. Pat. No. 3,276,944; Peterson, U.S. Pat. No. 3,502,538; Hartman, U.S. Pat. No. 3,502,763; Dobo et al., U.S. Pat. No. 3,542,615; and Harmon, Canadian Patent Number 803,714. All of the foregoing references are incorporated herein by reference in their entirety.

Bonded carded webs may also be used and, in general, are made from staple fibers which are usually purchased in bales. The bales are placed in a picker which separates the fibers. Next, the fibers are sent through a combining or carding unit which further breaks apart and aligns the staple fibers in the machine direction so as to form a machine direction-oriented fibrous non-woven web. Once the web has been formed, it is then bonded by one or more of several bonding methods. One bonding method is powder bonding wherein a powdered adhesive is distributed throughout the web and then activated, usually by heating the web and adhesive with hot air. Another bonding method is pattern bonding wherein heated calendar rolls or ultrasonic bonding equipment is used to bond the fibers together, usually in a localized bond pattern though the web and be bonded across its entire surface if so desired. When using bi-component staple fibers, through-air bonding equipment is, for many applications, especially advantageous.

Fibrous nonwoven webs made from multiconstituent and multicomponent fibers such as, for example, bicomponent fibers can also be used to form the support layer 14. See for example, U.S. Pat. No. 5,336,552 to Strack et al. which describes how to make bicomponent spunbond nonwoven webs. The Strack et al. patent is incorporated herein by reference in its entirety.

It is also possible to form laminates for use as the support layer 14 such as spunbond/meltblown laminates and spunbond/meltblown/spunbond laminates as are taught, for example, in U.S. Pat. No. 4,041,203 to Brock et al. which is incorporated herein by reference in its entirety.

Referring again to FIG. 1, the film layer 12 including calcium carbonate rich carrier phases 13 and letdown resin phases 15 may be a single or mono layer film or a multi-layer film such as is formed using a coextrusion process. Within the carrier base 13 are the predominant amount of calcium carbonate particles 17 surrounded by pores 19. When forming a multi-layer film, the film composition of the invention will usually form at least about 75%, desirably at least about 90% of the total film thickness and, when three or more layers are formed, will be a core component. The compositions of the additional layers will be selected to be compatible with and not materially alter the properties of the layer of the composition of the invention.

The formation of films is well known to those of ordinary skill in the film forming art and need not be discussed herein in detail. There are a large number of vendors who can manufacture such films to exacting specifications. For example, U.S. Pat. No. 6,114,024 to Forte describes film forming in detail and is incorporated herein by reference in its entirety.

To reduce the basis weight of layer 12, typically to less than 30 gsm, and provide breathability it is necessary to thin the film by stretching or orienting it in an apparatus like a machine direction orienter (MDO) unit such as is commercially available from the Marshall and Williams Company of Providence, Rhode Island. An MDO unit has a plurality of stretching rollers which progressively stretch and thin the film in the machine direction which is the direction of travel of the film through the apparatus. Other stretching means such as intermeshing grooved rolls may be used, for example, as described in U.S. Pat. No. 4,153,664 to Sabee, incorporated herein by reference in its entirety.

Once the film has been formed and thinned to where it has a basis weight, for example, in the range of from about 13 gsm to about 25 gsm and desired breathability, it is then laminated to the support layer 14. Suitable lamination means include, but are not limited to, adhesives, ultrasonic bonding and thermomechanical bonding as through the use of heated calendering rolls. Such calendering rolls will often include thermal point bonding with a patterned roll and a smooth anvil roll, though both rolls may be patterned or smooth and one, both or none of the rolls may be heated. As used herein the term "thermal point bonding" involves passing a fabric or web of fibers to be bonded between a heated calender roll and an anvil roll. The calender roll is usually, though not always, patterned in some way so that the entire fabric is not bonded across its entire surface, and the anvil roll is usually flat. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings, incorporated herein by reference in its entirety. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Yet another common pattern is the C-Star pattern which has a bond area of about 16.9%. The C-Star pattern has a cross-directional bar or "corduroy" design interrupted by shooting stars. Other common patterns include a diamond pattern with repeating and slightly offset diamonds with about a 16% bond area and a wire weave pattern looking as the name suggests, e.g. like a window screen, with about a 19% bond area. Typically, the percent bonding area varies from around 10% to around 30% of the area of the fabric laminate web. As is well known in the art, the spot bonding holds the layer or layers together as well as imparts integrity to each individual layer by bonding filaments and/or fibers within each layer. The term "bond" and derivatives as used herein includes attaching through an intermediate layer or layers unless the particular context demands otherwise.

Figure 4:
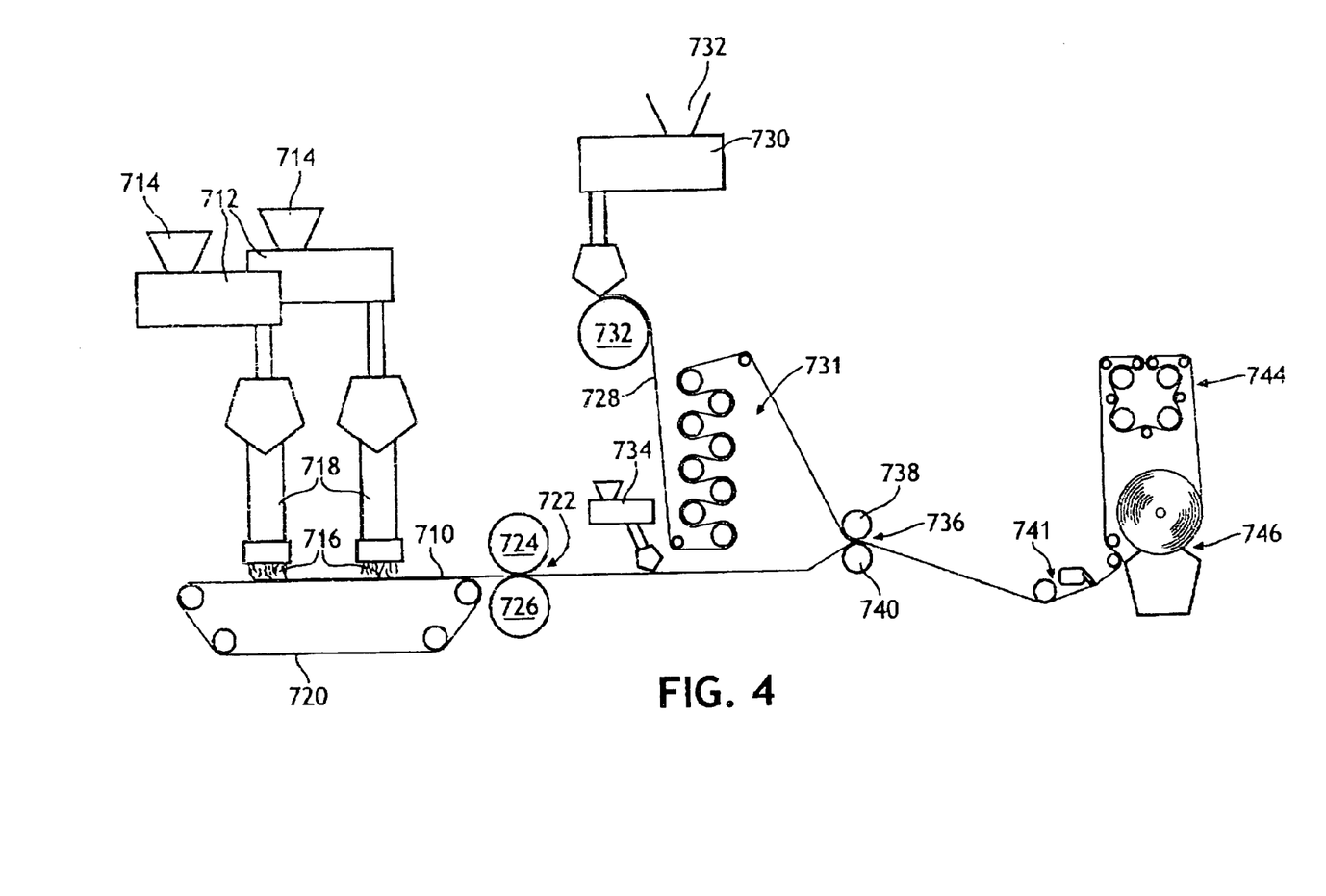
FIG. 4 is a schematic illustration of a process for making microporous film/nonwoven laminates using the present invention.

FIG. 4 is a schematic illustration of a film/nonwoven overall process incorporating the films of the present invention in a film/nonwoven laminate. As shown, spunbond nonwoven 710 is formed by feeding extruders 712 from polymer hoppers 714 and forming continuous filaments 716 from filament formers 718 onto web former 720 which may be, for example, a foraminous wire or belt rotating about support rolls, one or all of which may be driven. The resulting web 710 is thermal point bonded at calender nip 722 formed by a patterned roll 724 and anvil roll 726, one or both of which may be heated to a thermal bonding temperature. Adhesive applicator 734 applies an adhesive coat in a continuous or pattern to spunbond web 710 after calender nip 722. Film 728 is formed by feeding extruder 730 from polymer hopper 732 containing the carrier and letdown resin blended in accordance with the invention as described above and casting onto chill roll 732. The film 728 is stretched by MDO 731 and the film and spunbond are combined at nip 736 between rolls 738, 740 maintained at a desired adhesive bonding temperature. The laminate is then slit, if desired, at slitting section 741 and directed to winder 746 or, optionally, directed to further processing.

Examples of suitable adhesives that may be used in the practice of the invention include Rextac 2730, 2723 available from Huntsman Polymers of Houston, Tex., as well as adhesives available from Bostik Findley, Inc, of Wauwatosa, Wis. In an embodiment, the film and nonwoven support layer are laminated with an adhesive such that the basis weight of the adhesive is between 1.0 and 3.0 gsm. The type and basis weight of the adhesive used will be determined on the attributes desired in the final laminate. In another embodiment, the adhesive may be applied directly to the film layer prior to lamination with the nonwoven.

The problem that was occurring with previous film/nonwoven laminates as identified by the present inventors was that the film portion of the laminates was tearing when the laminate was stretched or being used as an outercover for diapers. As a result, the film toughness and extensibility properties were studied. Based upon this study, it was determined that the toughness of the film, particularly in the cross-machine direction can be materially increased using the letdown resin and film formulation in accordance with the invention. In addition, for the overall laminate to perform well, the laminate in accordance with the invention is be able to withstand a certain minimum load without failing, namely, at least 300 grams using the 2.54 cm (one inch) cut strip tensile test described below.

In view of the foregoing, laminates were prepared wherein the film had different levels and types of letdown resins. Toughness in terms of TEA and extensibility data were obtained for these various films (machine direction oriented), nonwovens and laminates. In cases where the letdown resin was within the above described density and M1 ranges, the film had improved toughness and extensibility. In visually observing the sample laminates as they were stretched, it was observed that the films did not fail prematurely. By prematurely it is meant that the films were tearing under strain in the cross machine direction and/or holes were forming under conditions that might be encountered under normal conditions of use.

The following test procedures were used to help analyze the examples set forth below. The test procedures for elongation and strain included elongation at break and at peak load as well as load at break and peak load. Other testing included film thickness or effective gauge. All values were measured in the cross-machine direction for the films, nonwovens and laminates. In addition, when the laminates were made, the film layer and the nonwoven layer were aligned prior to lamination such that the machine direction orientation of each layer was parallel to one another.

Strip Tensile

The load at % value is determined by first elongating a sample to a defined elongation in a particular direction (such as the CD) of a given percentage (such as 70, or 100 percent as indicated) and then measuring the load at the selected % value.

For the test results reflected herein, the defined elongation was 25 percent unless otherwise noted. The actual test method for determining load values is described below.

Figure 3:
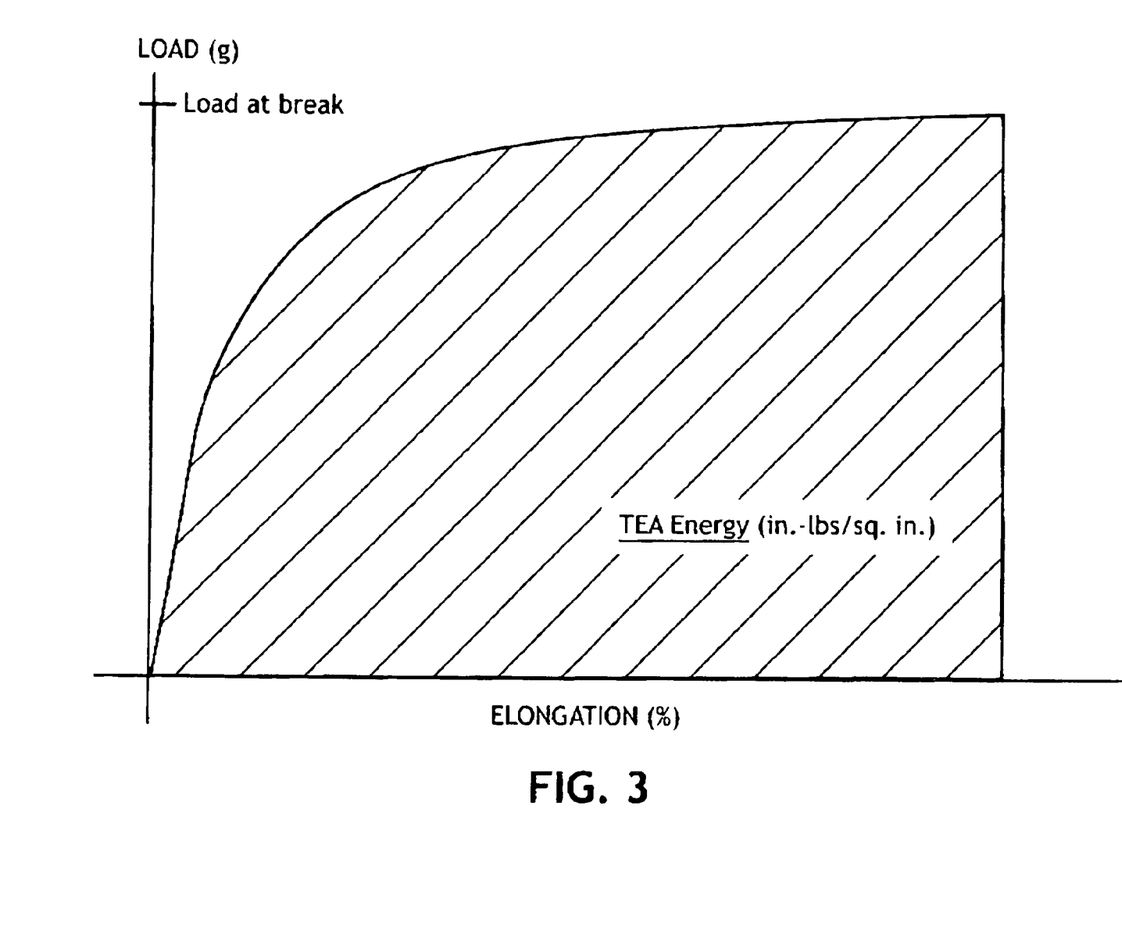
FIG. 3 illustrates the relationship between results for load, elongation and total energy absorbed (TEA) energy.

The materials were tested using a constant rate of extension testing device such as is available from Instron Corporation of Canton, Mass. using an Instron load cell or Sintech Corp. of Cary, N.C. Sample size was 25.4 mm by 152.4 mm, clamped between the grips, and stretched at a constant rate of 508 mm/min until sample breakage. The grip separation was 51 mm. The samples were loaded such that the cross-direction of the sample was in the vertical direction. The testing was done on a Sintech Corp. constant rate of extension tester 2/S with a Renew MTS mongoose box (controller) using TESTWORKS 4.07b software. (Sintech Corp, of Cary, N.C.). The tests were conducted under ambient conditions of about 73.5° F. and 50 percent relative humidity. Load in grams/force at 25% extension was recorded. FIG. 3 illustrates a typical curve obtained in this test showing the relationship between load as a function of extension, load at break and TEA, the area under the curve. This test comports in material respects to ASTM D882-97, incorporated herein by reference in its entirety.

WVTR

The Mocon test is standardized by INDA (Association of the Nonwoven Fabrics Indstry) as No. IST-70.4-99, entitled "STANDARD TEST METHOD FOR WATER VAPOR TRANSMISSION RATE THROUGH NONWOVEN AND PLASTIC FILM USING A GUARD FILM AND VAPOR PRESSURE SENSOR" which is incorporated herein by reference. The INDA procedure provides for the determination of WVTR, the permeance of the film to water vapor and, for homogeneous materials, water vapor permeability coefficient.

The INDA test method is well known and will not be set forth in detail herein. However, the test procedure is summarized as follows. A dry chamber is separated from a wet chamber of known temperature and humidity by a permanent guard film and the sample material to be tested. The purpose of the guard film is to define a definite air gap and ato quiet or still the air in the air gap while the air gap is characterized. The dry chamber, guard film, and the wet chamber make up a diffusion cell in which the test film is sealed. The sample holder is know as the Permatran-W Model 100K manufactured by Mocon/Modern Controls, Inc., Minneapolis, Minn. A first test is made of the WVTR of the guard film and the air gap between an evaporator assembly that generates 100% relative humidity. Water vapor diffuses through the air gap and the guard film and then mixes with a dry gas flow which is proportional to water vapor concentration. The electrical signal is routed to a computer for processing. The computer calculates the transmission rate of the air gap and the guard film and stores the value for further use.

The transmission rate of the guard film and the air gap is stored in the computer as CalC. The sample material is then sealed in the test cell. Again, water vapor diffuses through the air gap to the guard film and the test material and then mixes with a dry gas flow that sweeps the test material. This information is then used to calculate the transmission rate at which moisture is transmitted through the test material according to the equation:

$$TR(-1)(\text{test material})=TR(-1)(\text{test material, guard film, air gap})-TR(-1)\text{ guard film, airgap})$$

$$WVTR=Fo(\text{sat})(T)RH/Ap(\text{sat})(T)(1-RH))$$

Where:

F=The flow of water vapro in cc/min., $p(\text{sat})(T)$=The density of water in saturated air at temperature T, RH=The relative humidity at specified locations in the cell, A=The cross sectional area of the cell, and $p(\text{sat})(T)$=The saturation vapor pressure of water vapor at temperature T.

For the purposes of this Application, the testing temperature for the above test was at about 37.8° C., the flow was at 100 cc/min, and the relative humidity was at 60%. Additionally, the value for n was equal to 6 and the number of cycles was 3.

Melt Index

Melt Index is a measure of how easily a resin flows, and can be determined using ASTM Standard D1238, condition 190°/2.16 (Condition E). The two components in the film have different melt index values in order to obtain the improved results described herein. More particularly, the letdown resin, having a density broadly less than 0.915 g/cc has a melt index less than 6 g/10 min. In general, a polymer having a high melt index has a low viscosity. In accordance with the present invention the combination of melt index and density parameters of the carrier and letdown resins result in the improved two phase film with a reduced tendency to fail by splitting.

A series of examples was carried out to demonstrate and distinguish the attributes of the present invention.

Example 1

In Example 1 a film/nonwoven laminate was created. The film layer contained calcium carbonate dispersed in a carrier resin. Calcium carbonate, for example, available from Omya as designated 2SST having a top cut of 8-10 microns and about 1% stearic acid coating was used. The calcium carbonate (75%) and carrier resin (25%), Dowlex 2517 LLDPE (melt index of 25 and density of 0.917), compound was then blended in a single screw conventional extruder with a letdown resin of Affinity PL-1850 LLDPE, with a density of 0.902 and a melt index of 3.0, to provide a final calcium carbonate concentration of 52% by weight. The Dowlex® and Affinity polymers are available from Dow Chemical U.S.A. of Midland, Mich.

This formulation was formed into a film by casting onto a chill roll set to 80° F. at an unstretched basis weight of 40 gsm. The film was stretched 3.6 times its original length using a machine direction orienter (MDO) to a stretched basis weight of 16 gsm. As used herein, reference to stretching the film 3.6 times means that a film which, for example, had an initial length of 1 meter if stretched 3.6 times would have a final length of 3.6 meters. The film was heated to a temperature of 155° F. and it was run through the MDO at a line speed of 498 feet per minute to stretch the film. The film was then annealed at a temperature of 180° F.

The fibrous nonwoven web was a 0.4 osy spunbond web made with Exxon 3155 polypropylene, produced by Exxon/Mobil Corporation. The spunbond process used is generally as described in Haynes et al. U.S. patent application publication 2002-0117770, incorporated herein by reference in its entirety, and used a wire weave bond pattern.

Lamination of the two layers was effected using adhesive lamination with a slot die coater. Rextac 2730 APAO based adhesive, produced by Huntsman Polymers Corporation in Odessa, Tex., was melted to a temperature of 350° F. and applied to the spunbond sheet with an add-on level of 1.5 gsm. The spunbond and film webs were then married together by going through a low pressure combining nip providing sufficient pressure to assure full contact and at a speed of about 435 fpm and with unheated rolls. The resultant laminate had a combined basis weight of 31 gsm.

The laminate was then slit to a width of 13 inches by using shear slitters. The laminate immediately went through an s-wrap to isolate the draw away from the slitters and the adhesive lamination unit. The laminate was drawn 6% in the machine direction between the s-wrap and the first roll in the annealing unit causing the CD width to decrease to 9.75 inches, a 25% neck down. The laminate was then annealed at 200° F. over two rolls to set the neck in the material with the film side in contact with the rolls. Finally the material was carried with minimal draw to the winder for a final basis weight of 38 gsm.

Example 2

In Example 2 another film/nonwoven laminate was created. The film layer was the same as that used in Example 1 except that an Affinity PF1140 LLDPE (53%)/Dowlex 2244 LLDPE (47%) dry blend letdown resin was used instead of the Affinity PL-1850. The density of PF1140 is 0.897 and the melt index is 1.6. The density of Dow 2244 is 0.916 and the melt index is 3.3. The fibrous nonwoven web was the same as that used in Example 1.

Lamination of the two layers was performed in the same manner and under the same conditions as in Example 1.

The processing of the laminate was also performed in the same manner and under the same conditions as in Example 1.

Example 3

In Example 3 another film/nonwoven laminate was created. The film layer was the same as that used in Example 1 except that Attane 4404G LLDPE letdown resin, produced by Dow Chemical Company, was used instead of the Affinity PL-1850. The density of Attane 4404G is 0.904 and the melt index is 4.0. The fibrous nonwoven web was the same as that used in Example 1.

Lamination of the two layers was performed in the same manner and under the same conditions as in Example 1.

The processing of the laminate was also performed in the same manner and under the same conditions as in Example 1.

Comparative 1

In the comparative a film/nonwoven laminate was created. The film layer contained calcium carbonate as in Example 1 dispersed in a carrier resin. The calcium carbonate (75%) and carrier resin (25%), Dow 2517 LLDPE, compound was then blended in a single screw conventional extruder with a letdown resin of Dowlex 2047 LLDPE, with a density of 0.917 and a melt index of 2.3, to provide a final calcium carbonate concentration of 49% by weight. The Dowlex® polymers are available from Dow Chemical U.S.A. of Midland, Mich.

This formulation was formed into a film by casting onto a chill roll set to 90° F. at an unstretched basis weight of 54.7 gsm. The film was stretched 3.46 times its original length using a machine direction orienter (MDO) to a stretched basis weight of 20 gsm The film was heated to a temperature of 190° F. and it was run through the MDO at a line speed of 495 feet per minute to stretch the film.

Comparative 2

In the comparative a film/nonwoven laminate was created. The film layer contained calcium carbonate as in Example 1 dispersed in a carrier resin. The calcium carbonate (75%) and carrier resin (25%), Dow 2517 LLDPE, compound was then blended in a single screw conventional extruder with a letdown resin of Dowlex 2047 LLDPE, with a density of 0.917 and a melt index of 2.3, to provide a final calcium carbonate concentration of 58% by weight. The Dowlex® polymers are available from Dow Chemical U.S.A. of Midland, Mich.

This formulation was formed into a film by casting onto a chill roll set to 89° F. at an unstretched basis weight of 45 gsm. The film was stretched 3.45 times its original length using a machine direction orienter (MDO) to a stretched basis weight of 17.5 gsm The film was heated to a temperature of 190° F. and it was run through the MDO at a line speed of 581 feet per minute to stretch the film.

Comparative 3

In the comparative, a typical commercial film used in a leading diaper product was evaluated. It is a microporous, calcium carbonate loaded film believed to be supplied by Pliant Corporation and to contain an Affinity and Dowlex blend letdown.

Samples from the above described examples and the comparative example were tested for break strain and break strength, and the results are shown in Table 1 below:

TABLE I

| Example | Load at 25% | Break Strain % | Total Energy Absorbed at Peak In-Lb/Sq. In |
|---|---|---|---|
| 1 6000* | 103 | 647 | 2.02 |
| 2 6000* | 112 | 584 | 1.76 |
| 3 6000* | 113 | 624 | 1.88 |
| Comp 1 1500* | 165 | 402 | 1.40 |
| Comp 2 12000* | 109 | 297 | 0.74 |
| Comp 3 6000* | 165 | 361 | 1.55 |

*Nominal MOCON breathability MVTR value, g/m/24 hours

The lower load at 25% extension values obtained in accordance with the invention are an indication of easy extension when the diaper, for example, is being opened and stretched for being put in place on the wearer. The higher break strain and TEA values indicate the ability of the film/laminate to endure stretch forces applied in donning and in use.

In a study involving 30 infants (50% males, 50% females) given 5 diapers per day for a 7 day period, results summarized in Table 2 showed improvements in the areas of urine leakage, outer cover dampness, BM leakage, and red marking with the diapers with outercovers utilizing the film from Example 1. The outer cover dampness and % urine leak numbers are particularly impressive as critical issues of consumer acceptance.

TABLE 2

| Code Description | # of subjects | # of Used Diapers | % Urine Leaks | % Outer Cover Dampness | # BM Leaks | % Red Marking |
|---|---|---|---|---|---|---|
| Thermal Laminate w/film similar to Comparative 1 & 2 | 25 | 768 | 5.5 | 9.1 | 32 | 15.2 |
| Thermal Laminate w/film similar to Example 1 | 28 | 807 | 2.9 | 6.7 | 30 | 13.9 |

Thus, in accordance with the invention there has been provided films with improved strain properties and laminates of such films adapted for many uses including components of personal care products such as disposable diapers. While the invention has been described in terms of specific embodiments, it is not limited to such embodiments, and it is intended to embrace the full scope of the appended claims as broadly stated, including all equivalents to which such claims may be entitled.

We claim:

1. A breathable laminate having a moisture vapor transmission rate of at least about 300 g/m²/24 hours comprising a nonwoven support layer bonded to an oriented film comprising a letdown resin phase wherein said letdown resin comprises a first ethylene copolymer having a density between 0.900 and 0.915 g/cc and a melt index of no greater than 6 g/10 minutes and a carrier resin phase comprising a filler and a different ethylene polymer or copolymer having a density at least about 0.003 g/cc greater than the density of said letdown resin, wherein substantially all of said filler in said oriented film is contained only within discrete regions of said carrier resin phase and thereby separated from contact with said letdown phase, and wherein each of the discrete regions of the carrier resin phase is completely intermixed with and surrounded by the letdown resin phase.

2. The breathable laminate of claim 1 wherein the density of the film letdown resin is less than about 0.913 g/cc.

3. The breathable laminate of claim 2 wherein the density of the film letdown resin is in the range of from about 0.900 g/cc to about 0.912 g/cc.

4. The breathable laminate of claim 3 wherein the carrier resin ethylene polymer or copolymer has a density at least about 0.007 g/cc higher than that of said letdown resin.

5. The breathable laminate of claim 1 wherein the carrier resin ethylene polymer or copolymer has a melt index of at least about 10 g/10 min.

6. The breathable laminate of claim 1 wherein the carrier resin ethylene polymer or copolymer has a melt index of at least about 20 g/10 min.

7. The breathable laminate of claim 1 having a film basis weight in the range of from about 13 gsm to about 25 gsm.

8. The breathable laminate of claim 4 having a film basis weight in the range of from about 13 gsm to about 25 gsm.

9. The breathable laminate of claim 1 wherein the film has a calcium carbonate filler concentration based on the total film composition in the range of from about 30% to about 70% by weight.

10. The breathable laminate of claim 8 wherein the film has a calcium carbonate filler concentration based on the total film composition in the range of from about 30% to about 70% by weight.

11. The breathable laminate of claim 1 wherein both film ethylene copolymers are selected from the group consisting of linear low density polyethylene.

12. The breathable laminate of claim 10 wherein both film ethylene copolymers are selected from the group consisting of linear low density polyethylene.

13. The breathable laminate of claim 1 wherein said nonwoven comprises a spunbond nonwoven.

14. The breathable laminate of claim 12 wherein said nonwoven comprises a spunbond nonwoven.

15. The breathable laminate of claim 1 wherein said nonwoven comprises a bonded carded web.

16. The breathable laminate of claim 12 wherein said nonwoven comprises a bonded carded web.

17. The breathable laminate of claim 1 wherein said nonwoven comprises more than one layer.

18. The breathable laminate of claim 14 wherein said nonwoven comprises more than one layer.

19. The breathable laminate of claim 1 wherein said film comprises more than one layer.

20. The breathable laminate of claim 14 wherein said film comprises more than one layer.

21. The breathable laminate of claim 1 wherein said film has a break strain in the cross machine direction of greater than 300%.

22. The breathable laminate of claim 14 wherein said film has a break strain in the cross machine direction of greater than 300%.

23. The breathable laminate of claim 1 having a moisture vapor transmission rate of about 5000 g/m$^2$/24 hours to about 10,000 g/m$^2$/24 hours.

24. The breathable laminate of claim 1 wherein said film higher density ethylene copolymer has a density greater than 0.915 g/cc.

25. The breathable laminate of claim 14 wherein said letdown resin phase and said carrier resin phase comprise a layer constituting at least about 90% of the total film thickness.

26. A personal care product comprising the breathable film laminate of claim 1.

27. A disposable diaper comprising the breathable film laminate of claim 1 as a backing component.

* * * * *